United States Patent
Perez

(10) Patent No.: US 9,939,544 B2
(45) Date of Patent: Apr. 10, 2018

(54) BRANCH PATCH ARRAY FOR REAL TIME MONITORING OF SURFACE MICRO-SEISMIC WAVES

(71) Applicant: Gilberto Gomez Perez, Richmond, TX (US)

(72) Inventor: Gilberto Gomez Perez, Richmond, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 201 days.

(21) Appl. No.: 15/073,821

(22) Filed: Mar. 18, 2016

(65) Prior Publication Data

US 2017/0269249 A1 Sep. 21, 2017

(51) Int. Cl.
| | |
|---|---|
| *E21B 43/26* | (2006.01) |
| *G01V 1/40* | (2006.01) |
| *E21B 47/00* | (2012.01) |
| *G01V 1/18* | (2006.01) |
| *G01V 1/22* | (2006.01) |

(52) U.S. Cl.
CPC ........... *G01V 1/40* (2013.01); *E21B 43/26* (2013.01); *E21B 47/00* (2013.01); *G01V 1/181* (2013.01); *G01V 1/226* (2013.01); *G01V 2210/1234* (2013.01); *G01V 2210/1425* (2013.01)

(58) Field of Classification Search
CPC ........... E21B 43/26; G01V 1/22; G01V 1/226
See application file for complete search history.

(56) References Cited

U.S. PATENT DOCUMENTS

| 5,627,798 A | 5/1997 | Siems et al. | |
|---|---|---|---|
| 5,963,508 A * | 10/1999 | Withers | G01V 1/008 166/250.1 |
| 6,898,529 B2 * | 5/2005 | Gao | E21B 43/26 702/11 |
| 7,040,390 B2 * | 5/2006 | Tubel | E21B 23/03 166/250.01 |
| 2007/0177459 A1 | 8/2007 | Behn et al. | |
| 2013/0191031 A1 | 7/2013 | Mah et al. | |

(Continued)

OTHER PUBLICATIONS

Sercel; "428 XL, V5.0 Users Manual, vol. 1"; (2011); pp. 1-220.

(Continued)

*Primary Examiner* — Shane Bomar
(74) *Attorney, Agent, or Firm* — Cantor Colburn LLP

(57) ABSTRACT

An apparatus for acquiring seismic wave data includes a network of geophones and a seismic wave data receiving device coupled to the network and configured to receive the seismic wave data as an optical signal and process the seismic data in real time to provide locations and corresponding sizes of fractures in an earth formation. The network of geophones includes: a plurality of geophone channels, each channel having an array of geophones coupled to a field digitizer unit; an array of geophone patches having geophone channels connected in series by a metallic conductor; a plurality of geophone branches having a metallic conductor and a branch digitizer unit to connect geophone patches in series; a plurality of electrical to optical signal converters for converting signals received from branch digitizer units for transmission using an optical fiber; and a plurality of optical fiber segments for transmitting optical signals to the receiving device.

18 Claims, 5 Drawing Sheets

(56) References Cited

U.S. PATENT DOCUMENTS

2015/0103624 A1* 4/2015 Thompson ............... G01V 1/20
 367/7
2015/0369945 A1 12/2015 Drange
2016/0025876 A1 1/2016 Pennec et al.

OTHER PUBLICATIONS

Sercel; "Chapter 14, 428 Lite"; (2008); 428 XL Reference Training Guide; 11 pages.
Sercel; "Chapter 2, Seismic Areal Network"; (2008); Training Course Guide for 428XL; 76 pages.
Sercel; "Chapter 8 Field Know-How and Maintenance"; (2008); Training Course Guide for 428XL; 22 pages.
Sercel; "428 XL, V5.0 Users Manual, vol. 1"; (2011); pp. 201-429.
Sercel; "428 XL, V5.0 Users Manual, vol. 1"; (2011); pp. 430-637.
Sercel; "428 XL, V5.0 Users Manual, vol. 1"; (2011); pp. 638-728.
International Search Report and the Written Opinion of the International Searching Authority; PCT/US2017/022895; Korean Intellectual Property Office; dated Jun. 20, 2017; 8 pages.

* cited by examiner

BRANCH PATCH ARRAY FOR REAL TIME MONITORING OF SURFACE MICRO-SEISMIC WAVES

BACKGROUND

Unconventional earth formations such as shale typically require hydraulic fracturing to open up flow paths in order to extract hydrocarbons. Hydraulic fracturing though is resource intensive and costly. Consequently, it would be well received by the hydrocarbon production industry if techniques were developed to reduce the cost and improve the results of hydraulic fracturing.

BRIEF SUMMARY

Disclosed is an apparatus for acquiring seismic wave data. The apparatus includes a network of geophones and a seismic wave data receiving device coupled to the network of geophones and configured to receive the seismic wave data as an optical signal and process the seismic data in real time to provide locations and corresponding sizes of fractures in an earth formation. The network of geophones includes: a plurality of geophone channels, each geophone channel having an array of geophones coupled to a field digitizer unit configured to convert an analog electrical signal from the geophones to an digital electrical signal, the array of geophones for each geophone channel being coupled to the corresponding field digitizer unit by a metallic conductor; an array of geophone patches, each geophone patch having a unique subset of the plurality of geophone channels with the field digitizer units of the subset being connected in series by a metallic conductor; a plurality of geophone branches, each geophone branch having a metallic conductor and a branch digitizer unit configured to connect to one geophone patch or multiple geophone patches in series to relay a received digital electrical signal having seismic wave data from the one or multiple geophone branches; a plurality of electrical signal to optical signal (E/O) converters configured to convert an electrical signal received from a branch digitizer unit at an end of the multiple geophone patches in series or single geophone patch to an optical signal for transmission using an optical fiber; and a plurality of optical fiber segments, each optical fiber segment configured to convey an optical signal received from an E/O converter, wherein at least a subset of the E/O converters are connected in series with one E/O converter at an end of the series connected to the seismic wave data receiving device.

Also disclosed is a method for acquiring seismic wave data. The method includes: fracturing an earth formation to emit seismic waves using a hydraulic fracturing system; receiving seismic waves that travel through the earth formation using a network of geophones disposed at a surface of the earth that provides seismic wave data; transmitting the seismic wave data to a seismic wave data receiving device coupled to the network of geophones in real time, the seismic wave data receiving device being configured to receive the seismic wave data as an optical signal and process the seismic data in real time to provide locations and corresponding sizes of fractures in the earth formation; transmitting the locations and corresponding sizes of fractures in the earth formation to a user; and changing a variable or element of the hydraulic fracturing system based on the locations and corresponding sizes of fractures in the earth formation. The network of geophones includes: a plurality of geophone channels, each geophone channel having an array of geophones coupled to a field digitizer unit configured to convert an analog electrical signal from the geophones to an digital electrical signal, the array of geophones for each geophone channel being coupled to the corresponding field digitizer unit by a metallic wire; an array of geophone patches, each geophone patch having a unique subset of the plurality of geophone channels with the field digitizer units of the subset being connected in series by a metallic wire; a plurality of geophone branches, each geophone branch having a metallic conductor and a branch digitizer unit configured to connect to one geophone patch or multiple geophone patches in series to relay a received digital electrical signal having seismic wave data from the one or multiple geophone branches; a plurality of electrical signal to optical signal (E/O) converters configured to convert an electrical signal received from a branch digitizer unit at an end of the multiple geophone patches in series or single geophone patch to an optical signal for transmission using an optical fiber; and a plurality of optical fiber segments, each optical fiber segment configured to convey an optical signal received from an E/O converter, wherein at least a subset of the E/O converters are connected in series with one E/O converter at an end of the series connected to the seismic wave data receiving device.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are methods and apparatus for acquiring seismic data, which may include micro-seismic data from a network of geophones in real time. The network of geophones sense seismic waves that result from hydraulic fracturing of an earth formation. By acquiring the seismic data in real time, the results of the hydraulic fracturing and, thus, the efficacy of the hydraulic fracturing can be determined. If the results are not what were expected, then one or more variable or elements of the hydraulic fracturing can be changed quickly by a fracturing engineer before the next hydraulic fracturing process is implemented. Non-limiting embodiments of the fracturing variables or elements include fracture pressure, type of fracturing fluid and type of sand injected into the fractures of the formation.

Figure 1:
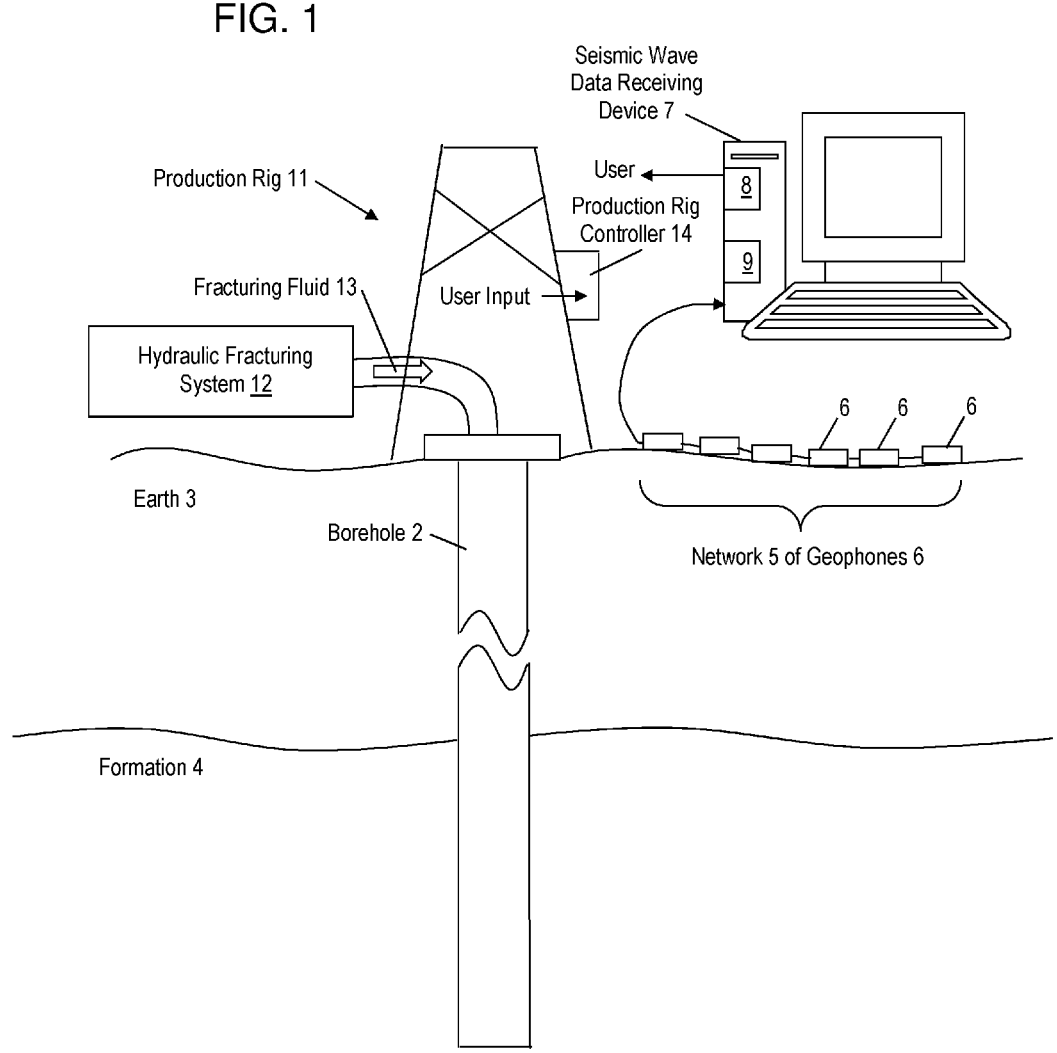
FIG. 1 depicts aspects of a geophone system for monitoring results of hydraulic fracturing.

FIG. 1 illustrates a cross-sectional view of a geophone system 10 disposed at the surface of the earth 3. The geophone system 10 includes a network 5 of geophones 6 where each geophone 6 is configured to sense seismic waves traveling through the earth 3 and earth formation 4. In one or more embodiments, one or more of the geophones 6 is a transducer that converts seismic wave motion to an electrical signal proportional to ground velocity (i.e., a velocimeter). The geophone system 10 further includes a seismic wave data receiving device 7 coupled to the network 5 of the geophones 6. The seismic wave data receiving device 7 is configured to process seismic data received from the geophone network 5 where the seismic data is received as an optical signal in real time. Here, "real time" relates to receiving the seismic data at the receiving device 7 in a very short period of time after seismic waves are sensed by the geophones 6 such as within several seconds in one or more embodiments. In general, processing of seismic data may include recording the data on a non-transient computer readable medium in a recorder 9 and executing a waveform inversion algorithm to estimate locations and sizes of individual fractures in an earth formation 4. Size information may include lengths and apertures of fracture planes. In that waveform inversion algorithms are known in the art, they are not discussed here in further detail. The seismic wave data receiving device 7 may include an output interface 8 for transmitting processed seismic data, such as the estimated locations of fractures and corresponding sizes, in real time to a user. Non-limiting embodiments of the output interface 8 include an internet connection, an Ethernet connection, a telephone modem, and a radio transmitter for transmitting the processed seismic data using radio waves.

FIG. 1 also illustrates a production rig 11 configured for performing operations related to the production of hydrocarbons. A borehole 2 penetrating the earth 3 and the formation 4 for the extraction of hydrocarbons is illustrated. The production rig 11 may include a hydraulic fracturing system 12 configured to pump fracturing fluid 13 into the borehole 2 at high pressures in order to fracture the earth formation 4. The hydraulic fracturing system 12 generally includes pumps, pipes and valves (not shown) necessary to pump the fracturing fluid into the borehole 2 and the earth formation 4 at a desired pressure and flow rate. A production rig controller 14 may be configured to control functions of the production rig 11 to include controlling aspects of the hydraulic fracturing system 12. The production rig controller 14 may also be configured to control hydrocarbon extraction flow rates by controlling associated pumps and/or flow control valves (not shown). It can be appreciated that by fracturing rock in the earth formation 4 using the hydraulic fracturing system 12 seismic waves will be emitted by the fracturing and these seismic waves can be received by the geophone network 5 in order to determine the locations and sizes of rock fractures.

Figure 2:
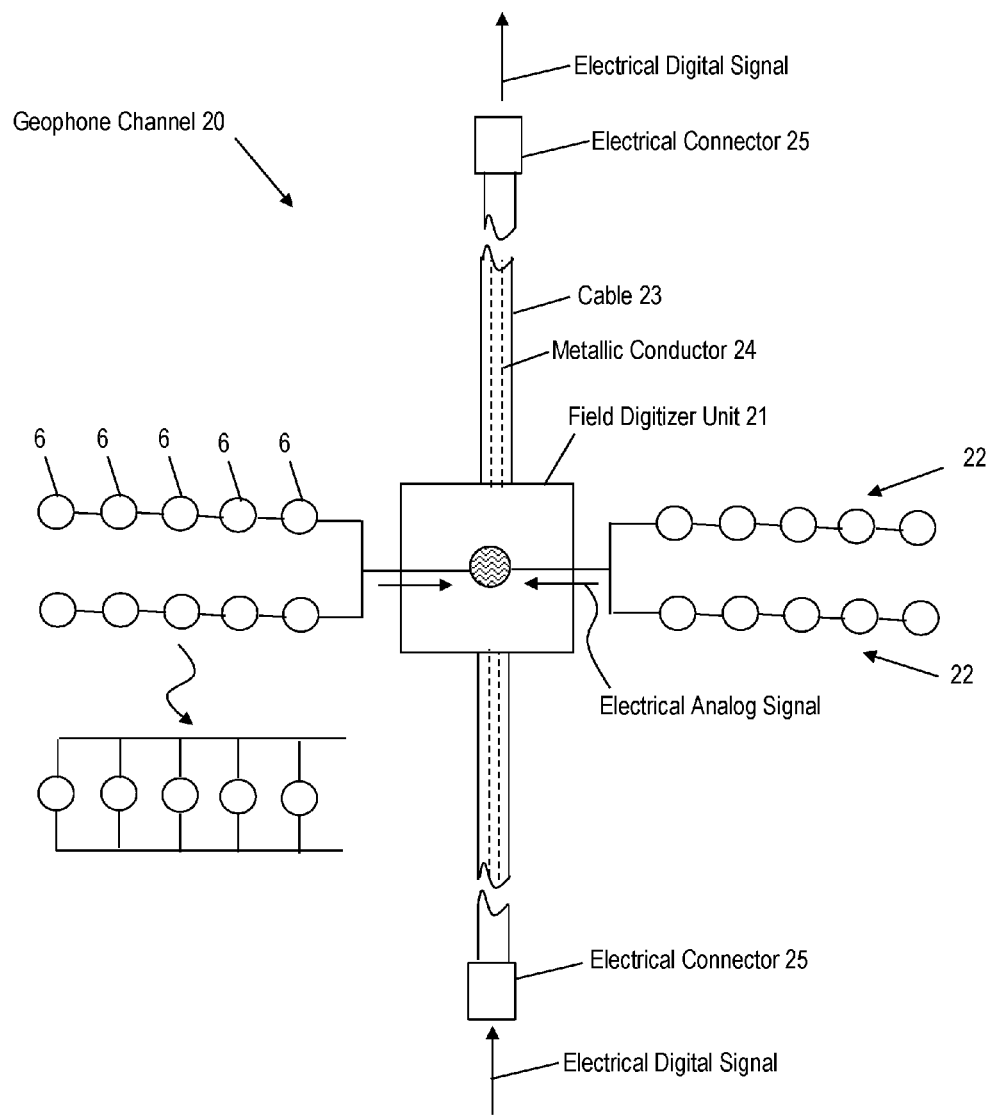
FIG. 2 depicts aspects of a plurality of geophones connected into a geophone channel.

FIG. 2 depicts aspects of a geophone channel 20. The geophone channel 20 includes a plurality of the geophones 6 connected to a field digitizer unit 21. The field digitizer unit 21 is configured to convert analog electrical signals received from the plurality of geophones 6 into an electrical digital signal. In one or more embodiments, the plurality of the geophones 6 is divided into a plurality of strings 22 of geophones 6 with the geophones in each string being connected in a parallel connection. This type of connection provides for electrical summation of the individual voltages of each geophone 6 to attenuate source noise and to improve the quality and stability of geophone coupling in the geophone network 5. This type of connection further improves the signal-to-noise ratio and increases the sensitivity of the geophones 6 to weak wave reflections. The plurality of the geophone strings 22 may also be connected in parallel at the digitizer unit 21 with the commensurate benefits described above. The field digitizer unit 21 may also be configured to relay (i.e., pass through or repeat) other electrical digital signals received for other field digitizer units 21. In one or more embodiments, each field digitizer unit 21 includes cable 23 having metallic conductors 24 for conveying the electrical digital signal. In one or more embodiments, the metallic conductors are copper conductors. One cable 23 of one field digitizer unit may be connected to another cable 23 of an adjacent field digitizer unit using an electrical connector 25 such as a male or female type electrical connector for example.

Figure 3:
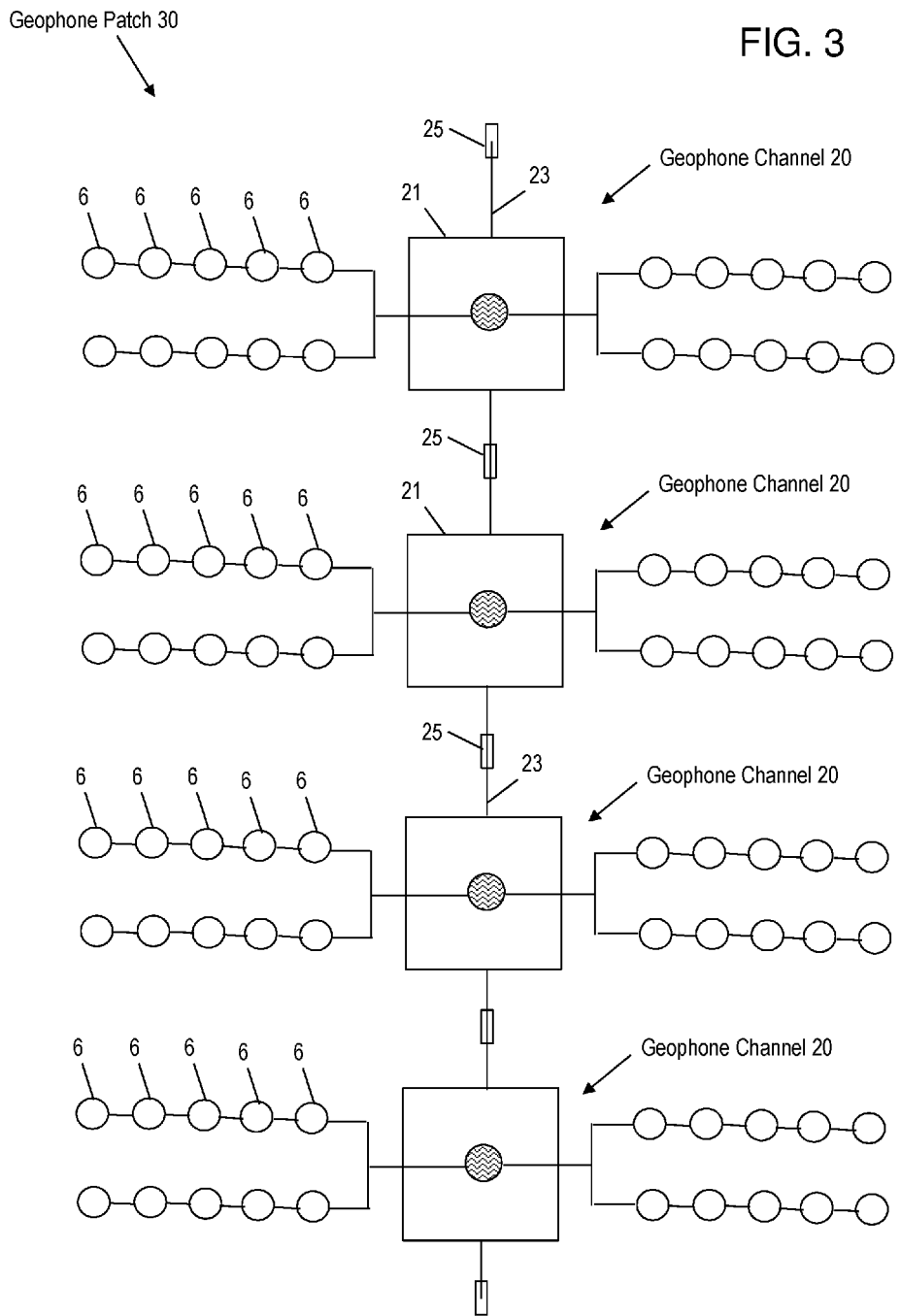
FIG. 3 depicts aspects of a plurality of geophone channels connected into a plurality geophone patch.

FIG. 3 depicts aspects of a geophone patch 30. The geophone patch 30 includes a plurality of geophone channels 20 connected in series such that the electrical digital signals are transmitted from one field digitizer unit 21 to an adjacent field digitizer unit 21 such that all electrical digital signals are eventually transmitted to one end of the geophone patch. One advantage of the geophone patch 30 is that it provides broad coverage over the area of the patch 30.

Figure 4:
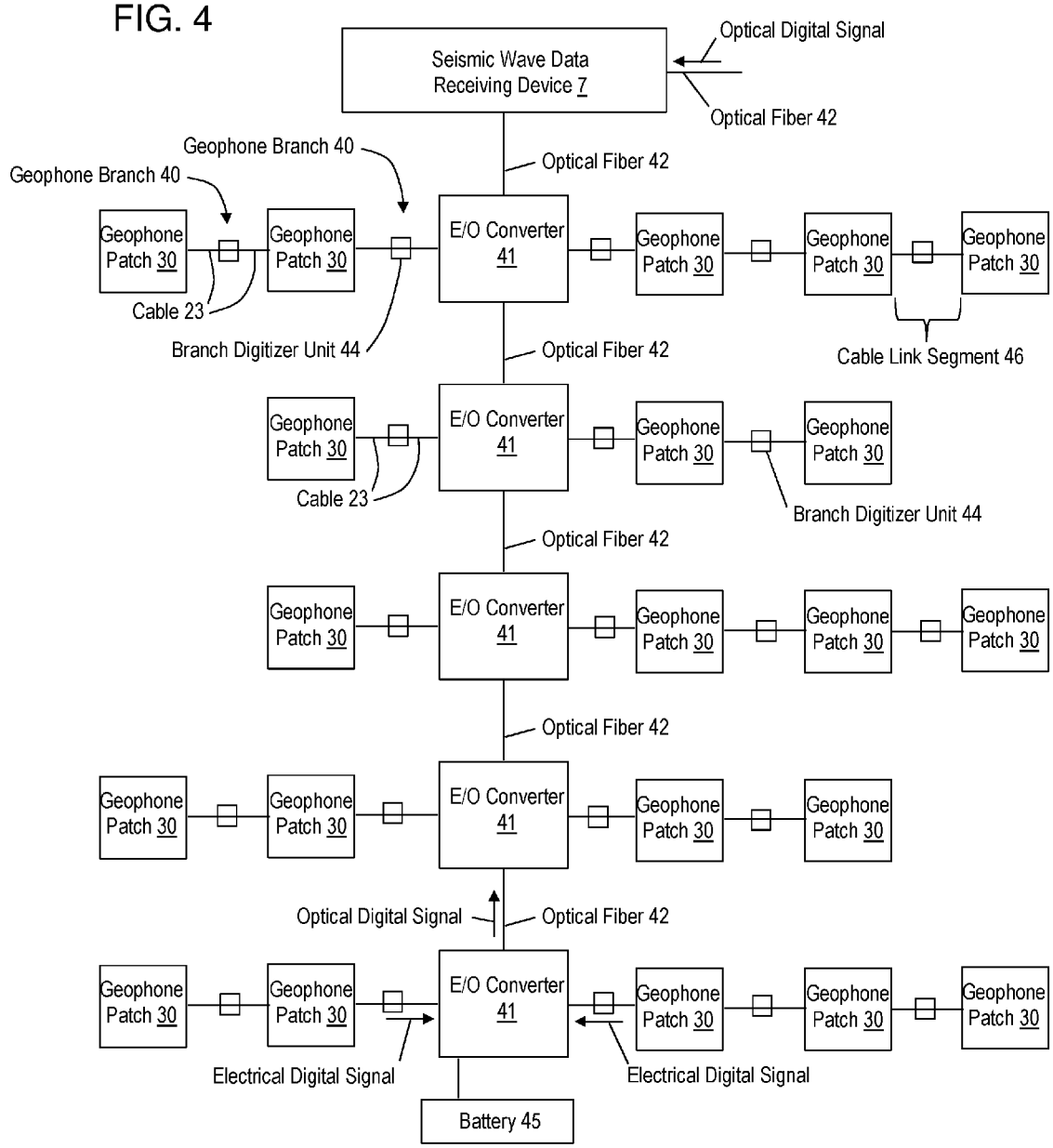
FIG. 4 depicts aspects of branches for connecting a plurality of geophone patches to an optical fiber.

FIG. 4 depicts aspects of geophone branches 40 for connecting a plurality of geophone patches 30 to an optical fiber 32. Each geophone branch 40 includes the cable 23 for conveying the electrical digital signal and a branch digitizer unit 44 for relaying any received electrical digital signals. The geophone branch 40 may be used to connect two geophone patches in series. In one or more embodiments, a plurality of geophone patches 30 may be connected in series with one or more geophone branches 40 disposed between adjacent geophone patches 30. In addition, the geophone branch 40 may be used to connect one geophone patch 30 or a series of geophone patches 30 to an electrical digital signal to optical digital signal (E/O) converter 41. The E/O converter 41 is configured to convert the electrical digital signal to an optical digital signal for conveyance to the seismic wave data receiving device 7 using one or more optical fibers 42. Each E/O converter 41 may be connected to one or more geophone branches 40. Hence, seismic wave data from one geophone branch 40 or a plurality of geophone branches 40 connected in series may be converted by the corresponding E/O converter 41 into the optical digital signal. The optical digital signal may be relayed or repeated by other E/O converters 41 in series until that optical digital signal is received by the seismic wave data receiving device 7. Multiple optical fibers 42 may be connected to the seismic wave data receiving device 7 in order to receive seismic wave data from other E/O converters 41 either singularly or a plurality of E/O converters 41 in series. The embodiment of FIG. 4 depicts the geophone branch 40 as having one cable link segment 45 that includes one branch digitizer unit 44 coupled to cables 23 on each side of the branch digitizer unit 44. In other embodiments, the geophone branch 40 can have multiple cable link segments 46 coupled in series in order to connect geophone patches 30 separated by long distances. Each E/O converter 41 may be powered locally such as by a battery 45. Batteries 45 may also be used to power other field components. It can be appreciated that in one or more embodiments the geophone patches do not overlap and each geophone patch is separated from one or more adjacent geophone patches by at least 500 feet in order to provide broad coverage and precise seismic wave readings.

Figure 5:
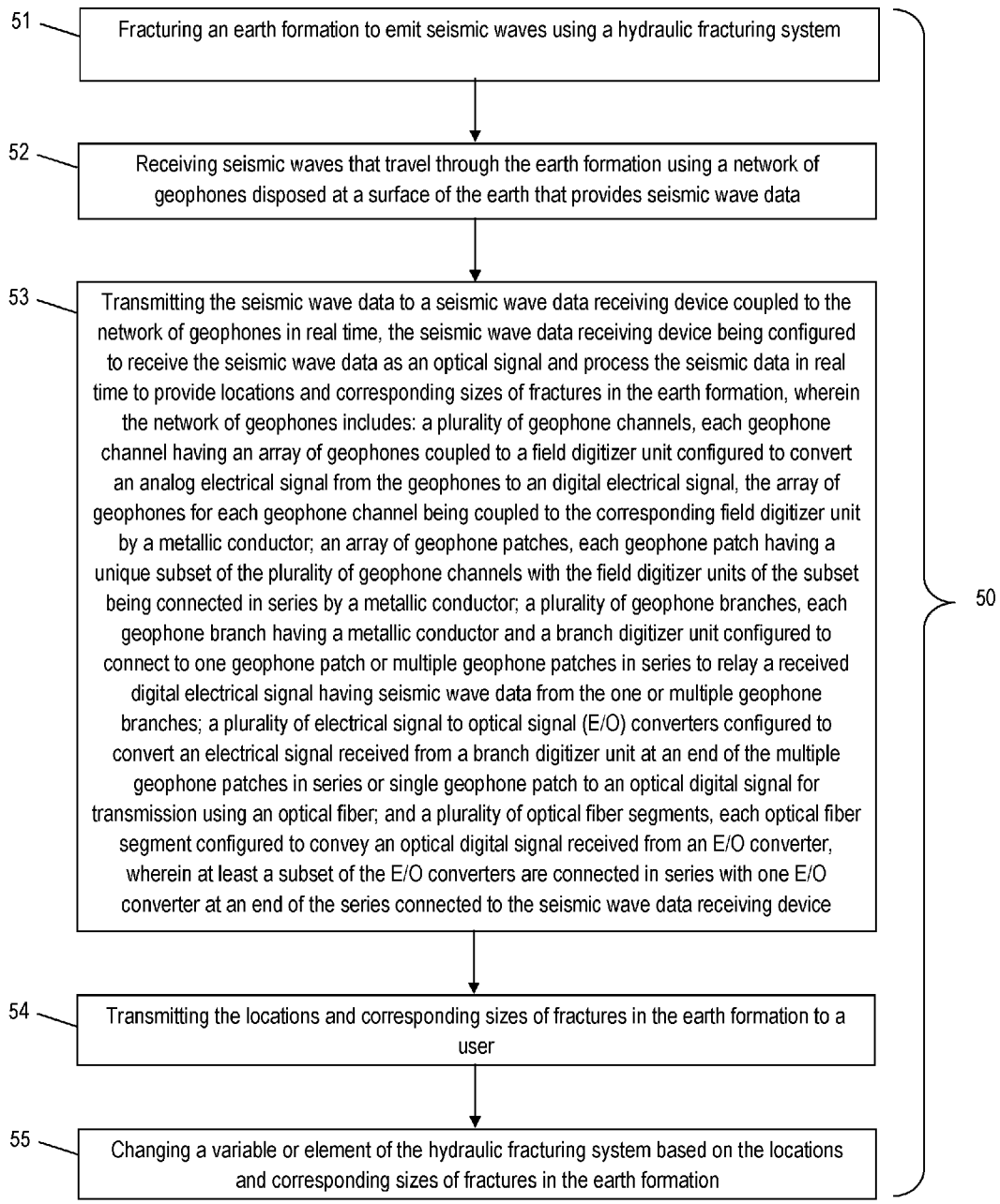
FIG. 5 is a flow chart for a method for sensing seismic waves.

FIG. 5 is a flow chart for a method 50 for acquiring seismic wave data. Block 51 calls for fracturing an earth formation to emit seismic waves using a hydraulic fracturing system. Block 52 calls for receiving seismic waves that travel through the earth formation using a network of geophones disposed at a surface of the earth that provides seismic wave data. Block 53 calls for transmitting the seismic wave data to a seismic wave data receiving device coupled to the network of geophones in real time, the seismic wave data receiving device being configured to receive the seismic wave data as an optical signal and process the seismic data in real time to provide locations and corresponding sizes of fractures in the earth formation, wherein the network of geophones includes: a plurality of geophone channels, each geophone channel having an array of geophones coupled to a field digitizer unit configured to convert an analog electrical signal from the geophones to an digital electrical signal, the array of geophones for each geophone channel being coupled to the corresponding field digitizer unit by a metallic conductor; an array of geophone patches, each geophone patch having a unique subset of the plurality of geophone channels with the field digitizer units of the subset being connected in series by a metallic conductor; a plurality of geophone branches, each geophone branch having a metallic conductor and a branch digitizer unit configured to connect to one geophone patch or multiple geophone patches in series to relay a received digital electrical signal having seismic wave data from the one or multiple geophone branches; a plurality of electrical signal to optical signal (E/O) converters configured to convert an electrical signal received from a branch digitizer unit at an end of the multiple geophone patches in series or single geophone patch to an optical signal for transmission using an optical fiber; and a plurality of optical fiber segments, each optical fiber segment configured to convey an optical signal received from an E/O converter, wherein at least a subset of the E/O converters are connected in series with one E/O converter at an end of the series connected to the seismic wave data receiving device. Block 54 calls for transmitting the locations and corresponding sizes of fractures in the earth formation to a user. Block 55 calls for changing a variable or element of the hydraulic fracturing system based on the locations and corresponding sizes of fractures in the earth formation. It can be appreciated that a reservoir engineer skilled in the art of hydraulic fracturing would understand how to select and change the appropriate variable or element to achieve a desired fracturing result based upon analyzing the locations and corresponding sizes of fractures resulting from previous hydraulic fracturing.

The method 50 may also include fracturing the earth formation using the hydraulic fracturing system with the changed variable or element. In one or more embodiments, the changed variable or element may include a fracturing pressure, a fracture fluid flowrate, a type of sand injected into the fracture, or some combination thereof.

The topology or configuration of the network 5 of geophones 6 provides several advantages. One advantage as described above is the ability of the seismic wave data receiving device to receive the seismic wave data in real time from the geophone patches 30 and, thus, the geophones 6 covering a very large area. Hence, the seismic wave data receiving device can process the received seismic wave data in real time and provide fracture locations and sizes to a user in real time. Consequently, the user can change parameters of the hydraulic fracturing system quickly so that the next hydraulic fracturing process may achieve a desired outcome. Another advantage of the topology of the network 5 of geophones 6 is that it can be set up expeditiously lowering installation costs. Yet another advantage is that the seismic wave data receiving device can be configured to provide a synthetic wave data signal that simulates the seismic wave signals that would be received by the seismic wave data receiving device resulting from the geophones receiving seismic waves of a simulated amplitude and/or velocity. The synthetic wave data can then be inverted by the waveform inversion algorithm to estimate locations and sizes of fractures in the formation that would cause the seismic waves having the simulated amplitude and/or velocity. Hence, by using the synthetic wave data signal, results of simulated hydraulic fracturing with selected variables and elements can be simulated.

It can be appreciated that the above disclosed components (e.g., geophones, digitizer units, E/O converters and cables) for assembling the network 5 of geophones 6 are commercially available. Hence, these components are not discussed in further detail. One source of the disclosed components is Sercel, headquartered in Nantes, France.

Set forth below are some embodiments of the foregoing disclosure:

Embodiment 1

An apparatus for acquiring seismic wave data, the apparatus comprising: a network of geophones; and a seismic wave data receiving device coupled to the network of geophones and configured to receive the seismic wave data as an optical signal and process the seismic data in real time to provide locations and corresponding sizes of fractures in an earth formation; the network of geophones comprising: a plurality of geophone channels, each geophone channel comprising an array of geophones coupled to a field digitizer unit configured to convert an analog electrical signal from the geophones to an digital electrical signal, the array of geophones for each geophone channel being coupled to the corresponding field digitizer unit by a metallic conductor; an array of geophone patches, each geophone patch comprising a unique subset of the plurality of geophone channels with the field digitizer units of the subset being connected in series by a metallic conductor; a plurality of geophone branches, each geophone branch comprising a metallic conductor and a branch digitizer unit configured to connect to one geophone patch or multiple geophone patches in series to relay a received digital electrical signal having seismic wave data from the one or multiple geophone branches; a plurality of electrical signal to optical signal (E/O) converters configured to convert an electrical signal received from a branch digitizer unit at an end of the multiple geophone patches in series or single geophone patch to an optical signal for transmission using an optical fiber; and a plurality of optical fiber segments, each optical fiber segment configured to convey an optical signal received from an E/O converter, wherein at least a subset of the E/O converters are connected in series with one E/O converter at an end of the series connected to the seismic wave data receiving device.

Embodiment 2

The apparatus according to claim 1, wherein the array of geophones in at least one geophone channel in the plurality of geophone channels comprises a plurality of geophone strings with each geophone string comprising multiple geophones electrically connected in parallel.

Embodiment 3

The apparatus according to claim 2, wherein the plurality of geophone strings are electrically connected in parallel.

Embodiment 4

The apparatus according to claim 1, wherein each field digitizer unit is configured to provide a unique identifier to the corresponding digital electrical signal to identify that field digitizer unit so that measurements performed by the corresponding array of geophones are uniquely identified.

Embodiment 5

The apparatus according to claim 1, wherein geophone patches in the array of geophone patches do not overlap an area of coverage with each other.

Embodiment 6

The apparatus according to claim 5, wherein each geophone patch is separated from one or more adjacent geophone patches by at least 500 feet.

Embodiment 7

The apparatus according to claim 1, wherein a single geophone patch is connected to one E/O converter by a geophone branch.

Embodiment 8

The apparatus according to claim 1, wherein a geophone branch in the plurality of geophone branches comprises multiple geophone branches connected in series Embodiment 9

The apparatus according to claim 1, wherein seismic wave data is transmitted to the seismic wave data receiving device at a speed of at least eight mega-bits per second.

Embodiment 10

The apparatus according to claim 1, wherein each E/O converter is locally powered by a battery.

Embodiment 11

The apparatus according to claim 1, wherein the seismic wave data receiving device comprises a recorder configured to record received seismic wave data.

Embodiment 12

The apparatus according to claim 1, wherein the seismic wave data receiving device comprises a processor configured to invert the received seismic wave data in accordance with an inversion algorithm to provide the locations and corresponding sizes of fractures in the earth formation.

Embodiment 13

The apparatus according to claim 12, wherein the seismic wave data receiving device further comprises an output interface configured to transmit a signal comprising the locations and corresponding sizes of fractures in the earth formation.

Embodiment 14

The apparatus according to claim 1, further comprising a hydraulic fracturing system configured to fracture the earth formation in order to emit seismic waves into the earth formation, the hydraulic fracturing system comprising a variable or element used in fracturing the earth formation, wherein the variable or element is changeable based upon the locations and corresponding sizes of fractures in the earth formation.

Embodiment 15

The apparatus according to claim 14, wherein the variable or element of hydraulic fracturing system comprises a fracturing pressure, a fracture fluid flowrate, a type of sand injected into the fractures, or some combination therein.

Embodiment 16

A method for acquiring seismic wave data, the method comprising: fracturing an earth formation to emit seismic waves using a hydraulic fracturing system; receiving seismic waves that travel through the earth formation using a network of geophones disposed at a surface of the earth that provides seismic wave data; transmitting the seismic wave data to a seismic wave data receiving device coupled to the network of geophones in real time, the seismic wave data receiving device being configured to receive the seismic wave data as an optical signal and process the seismic data in real time to provide locations and corresponding sizes of fractures in the earth formation; transmitting the locations and corresponding sizes of fractures in the earth formation to a user; and changing a variable or element of the hydraulic fracturing system based on the locations and corresponding sizes of fractures in the earth formation; wherein the network of geophones comprises: a plurality of geophone channels, each geophone channel comprising an array of geophones coupled to a field digitizer unit configured to convert an analog electrical signal from the geophones to an digital electrical signal, the array of geophones for each geophone channel being coupled to the corresponding field digitizer unit by a metallic wire; an array of geophone patches, each geophone patch comprising a unique subset of the plurality of geophone channels with the field digitizer units of the subset being connected in series by a metallic wire; a plurality of geophone branches, each geophone branch comprising a metallic conductor and a branch digitizer unit configured to connect to one geophone patch or multiple geophone patches in series to relay a received digital electrical signal having seismic wave data from the one or multiple geophone branches; a plurality of electrical signal to optical signal (E/O) converters configured to convert an electrical signal received from a branch digitizer unit at an end of the multiple geophone patches in series or single geophone patch to an optical signal for transmission using an optical fiber; and a plurality of optical fiber segments, each optical fiber segment configured to convey an optical signal received from an E/O converter, wherein at least a subset of the E/O converters are connected in series with one E/O converter at an end of the series connected to the seismic wave data receiving device.

Embodiment 17

The method according to claim 16, further comprising fracturing the earth formation using the hydraulic fracturing system with the changed variable or element.

Embodiment 18

The method according to claim 16, wherein the variable or element of hydraulic fracturing system comprises a fracturing pressure, a fracture fluid flowrate, a type of sand injected into the fracture, or some combination thereof.

In support of the teachings herein, various analysis components may be used including a digital and/or an analog system. For example, the geophone system 10, the seismic wave data receiving device 7, the hydraulic fracturing system 12, the production rig controller 14, the field digitizer unit 21, the branch digitizer unit 44, and/or the D/O converter 41 may include digital and/or analog systems. The system may have components such as a processor, storage media, memory, input, output, communications link (wired, wireless, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. Processed data such as a result of an implemented method may be transmitted as a signal via a processor output interface to a signal receiving device. The signal receiving device may be a display monitor or printer for presenting the result to a user. Further, an alert signal may be transmitted from the processor to a user interface if the result exceeds a threshold value.

Further, various other components may be included and called upon for providing for aspects of the teachings herein. For example, a sensor, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for acquiring seismic wave data, the apparatus comprising:
    a network of geophones; and
    a seismic wave data receiving device coupled to the network of geophones and configured to receive the seismic wave data as an optical signal and process the seismic data in real time to provide locations and corresponding sizes of fractures in an earth formation;
    the network of geophones comprising:
    a plurality of geophone channels, each geophone channel comprising an array of geophones coupled to a field digitizer unit configured to convert an analog electrical signal from the geophones to an digital electrical signal, the array of geophones for each geophone channel being coupled to the corresponding field digitizer unit by a metallic conductor;
    an array of geophone patches, each geophone patch comprising a unique subset of the plurality of geophone channels with the field digitizer units of the subset being connected in series by a metallic conductor;
    a plurality of geophone branches, each geophone branch comprising a metallic conductor and a branch digitizer unit configured to connect to one geophone patch or multiple geophone patches in series to relay a received digital electrical signal having seismic wave data from the one or multiple geophone branches;
    a plurality of electrical signal to optical signal (E/O) converters configured to convert an electrical signal received from a branch digitizer unit at an end of the multiple geophone patches in series or single geophone patch to an optical signal for transmission using an optical fiber; and
    a plurality of optical fiber segments, each optical fiber segment configured to convey an optical signal received from an E/O converter, wherein at least a subset of the E/O converters are connected in series with one E/O converter at an end of the series connected to the seismic wave data receiving device.

2. The apparatus according to claim 1, wherein the array of geophones in at least one geophone channel in the plurality of geophone channels comprises a plurality of geophone strings with each geophone string comprising multiple geophones electrically connected in parallel.

3. The apparatus according to claim 2, wherein the plurality of geophone strings are electrically connected in parallel.

4. The apparatus according to claim 1, wherein each field digitizer unit is configured to provide a unique identifier to the corresponding digital electrical signal to identify that field digitizer unit so that measurements performed by the corresponding array of geophones are uniquely identified.

5. The apparatus according to claim 1, wherein geophone patches in the array of geophone patches do not overlap an area of coverage with each other.

6. The apparatus according to claim 5, wherein each geophone patch is separated from one or more adjacent geophone patches by at least 500 feet.

7. The apparatus according to claim 1, wherein a single geophone patch is connected to one E/O converter by a geophone branch.

8. The apparatus according to claim 1, wherein a geophone branch in the plurality of geophone branches comprises multiple geophone branches connected in series.

9. The apparatus according to claim 1, wherein seismic wave data is transmitted to the seismic wave data receiving device at a speed of at least eight mega-bits per second.

10. The apparatus according to claim 1, wherein each E/O converter is locally powered by a battery.

11. The apparatus according to claim 1, wherein the seismic wave data receiving device comprises a recorder configured to record received seismic wave data.

12. The apparatus according to claim 1, wherein the seismic wave data receiving device comprises a processor configured to invert the received seismic wave data in accordance with an inversion algorithm to provide the locations and corresponding sizes of fractures in the earth formation.

13. The apparatus according to claim 12, wherein the seismic wave data receiving device further comprises an output interface configured to transmit a signal comprising the locations and corresponding sizes of fractures in the earth formation.

14. The apparatus according to claim 1, further comprising a hydraulic fracturing system configured to fracture the earth formation in order to emit seismic waves into the earth formation, the hydraulic fracturing system comprising a variable or element used in fracturing the earth formation, wherein the variable or element is changeable based upon the locations and corresponding sizes of fractures in the earth formation.

15. The apparatus according to claim 14, wherein the variable or element of hydraulic fracturing system comprises a fracturing pressure, a fracture fluid flowrate, a type of sand injected into the fractures, or some combination therein.

16. A method for acquiring seismic wave data, the method comprising:
    fracturing an earth formation to emit seismic waves using a hydraulic fracturing system;
    receiving seismic waves that travel through the earth formation using a network of geophones disposed at a surface of the earth that provides seismic wave data;
    transmitting the seismic wave data to a seismic wave data receiving device coupled to the network of geophones in real time, the seismic wave data receiving device being configured to receive the seismic wave data as an optical signal and process the seismic data in real time to provide locations and corresponding sizes of fractures in the earth formation;
    transmitting the locations and corresponding sizes of fractures in the earth formation to a user; and
    changing a variable or element of the hydraulic fracturing system based on the locations and corresponding sizes of fractures in the earth formation;
    wherein the network of geophones comprises:
    a plurality of geophone channels, each geophone channel comprising an array of geophones coupled to a field digitizer unit configured to convert an analog electrical signal from the geophones to an digital electrical signal, the array of geophones for each geophone channel being coupled to the corresponding field digitizer unit by a metallic wire;
    an array of geophone patches, each geophone patch comprising a unique subset of the plurality of geophone channels with the field digitizer units of the subset being connected in series by a metallic wire;
    a plurality of geophone branches, each geophone branch comprising a metallic conductor and a branch digitizer unit configured to connect to one geophone patch or multiple geophone patches in series to relay a received digital electrical signal having seismic wave data from the one or multiple geophone branches;
    a plurality of electrical signal to optical signal (E/O) converters configured to convert an electrical signal received from a branch digitizer unit at an end of the multiple geophone patches in series or single geophone patch to an optical signal for transmission using an optical fiber; and
    a plurality of optical fiber segments, each optical fiber segment configured to convey an optical signal received from an E/O converter, wherein at least a subset of the E/O converters are connected in series with one E/O converter at an end of the series connected to the seismic wave data receiving device.

17. The method according to claim 16, further comprising fracturing the earth formation using the hydraulic fracturing system with the changed variable or element.

18. The method according to claim 16, wherein the variable or element of hydraulic fracturing system comprises a fracturing pressure, a fracture fluid flowrate, a type of sand injected into the fracture, or some combination thereof.

* * * * *